United States Patent
Nagel

(10) Patent No.: US 11,206,840 B2
(45) Date of Patent: Dec. 28, 2021

(54) APPARATUS FOR CARRYING OUT AN OPERATION ON SLAUGHTERED POULTRY OR ON A PART OF SLAUGHTERED POULTRY

(71) Applicant: Meyn Food Processing Technology B.V., Oostzaan (NL)

(72) Inventor: Bas Nagel, Oostzaan (NL)

(73) Assignee: Meyn Food Processing Technology B.V, Oostzaan (NL)

( * ) Notice: Subject to any disclaimer, the term of this patent is extended or adjusted under 35 U.S.C. 154(b) by 0 days.

(21) Appl. No.: 16/884,819

(22) Filed: May 27, 2020

(65) Prior Publication Data
US 2020/0375201 A1    Dec. 3, 2020

(30) Foreign Application Priority Data
May 27, 2019 (NL) .................................. 2023211

(51) Int. Cl.
*A22B 7/00* (2006.01)
*A22C 21/00* (2006.01)

(52) U.S. Cl.
CPC .......... *A22B 7/002* (2013.01); *A22C 21/0046* (2013.01)

(58) Field of Classification Search
CPC ............ A22B 7/00; A22B 7/002; A22B 17/16
USPC ........ 452/107, 117–119, 134, 160, 165, 167, 452/185, 187, 188
See application file for complete search history.

(56) References Cited

U.S. PATENT DOCUMENTS

| | | | |
|---|---|---|---|
| 4,730,365 A | 3/1988 | Simmons | |
| 4,918,787 A * | 4/1990 | Hazenbroek | A22C 21/00 452/116 |
| 5,001,812 A * | 3/1991 | Hazenbroek | A22C 17/04 452/135 |
| 5,069,652 A * | 12/1991 | Hazenbroek | A22C 21/0023 452/165 |
| 5,154,664 A * | 10/1992 | Hazenbroek | A22C 21/0023 452/117 |
| 6,213,864 B1 * | 4/2001 | Griffiths | A22B 5/0094 452/116 |
| 2002/0173261 A1 * | 11/2002 | Gooren | A22C 21/06 452/134 |

(Continued)

FOREIGN PATENT DOCUMENTS

| | | |
|---|---|---|
| EP | 0432317 | 6/1991 |
| EP | 2965632 | 1/2016 |

OTHER PUBLICATIONS

International Search Report for Netherlands Application No. 2023211 dated Feb. 4, 2020, 10 pages.

*Primary Examiner* — Richard T Price, Jr.
(74) *Attorney, Agent, or Firm* — Dority & Manning, P.A.

(57) ABSTRACT

An apparatus for carrying out an operation on slaughtered poultry or on a part of slaughtered poultry. At least one carrier device, a drum which at its periphery is provided with at least one groove, which at least one groove is traced by a roller that is mounted on the at least one carrier device so as to arrange that movement of the at least one carrier device along the periphery of the drum causes the at least one carrier device to execute an operation with reference to the poultry or poultry part. A movable mounting block that supports the roller, wherein the movable mounting block is up-and-down movable with reference to the remainder of the at least one carrier device.

12 Claims, 4 Drawing Sheets

(56) References Cited

U.S. PATENT DOCUMENTS

| | | | |
|---|---|---|---|
| 2008/0182495 A1* | 7/2008 | Chattin | A22C 21/06 452/123 |
| 2009/0203303 A1* | 8/2009 | Chattin | A22C 21/06 452/116 |
| 2010/0317272 A1* | 12/2010 | Hazenbroek | A22C 21/0023 452/125 |
| 2016/0007620 A1* | 1/2016 | Van Stralen | A22C 21/06 452/106 |

* cited by examiner

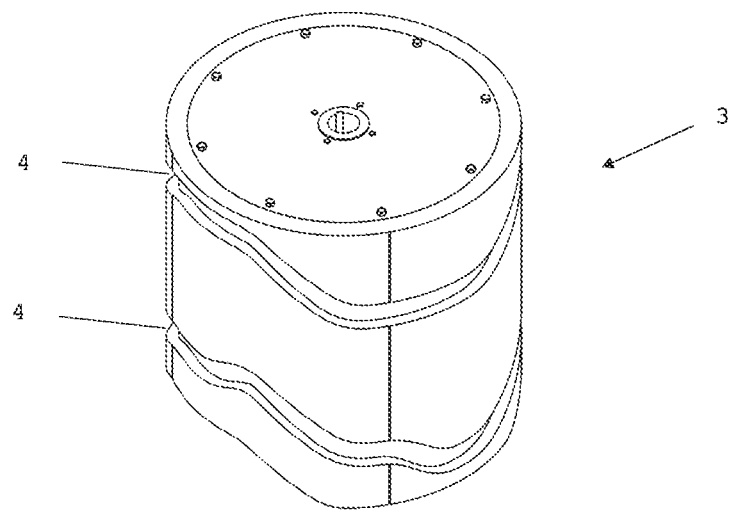
Fig. 1 – PRIOR ART
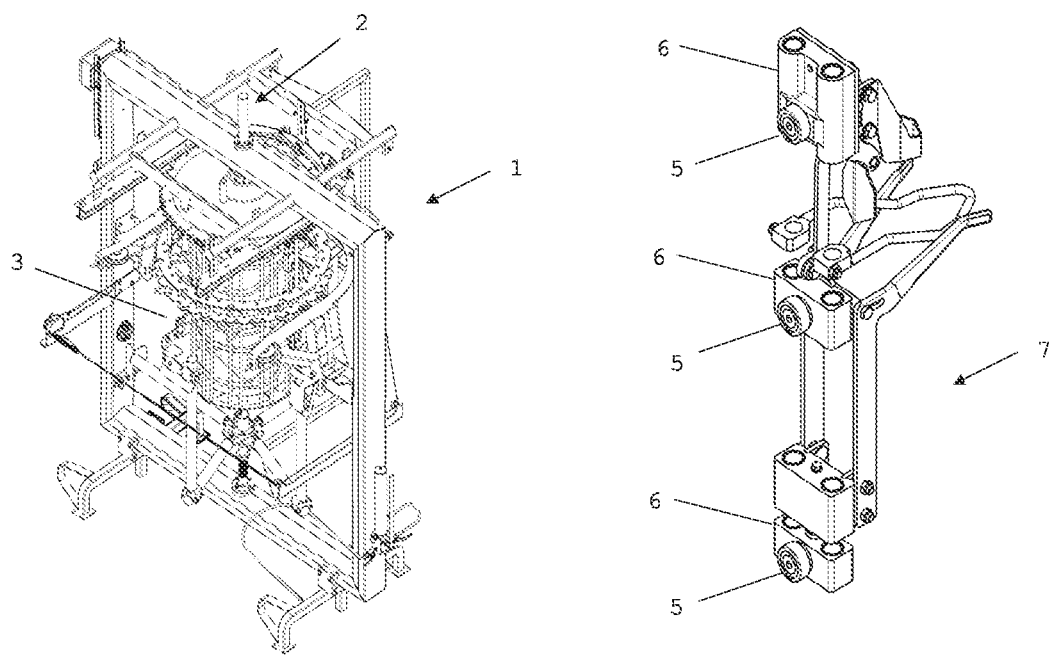
Fig. 2 – PRIOR ART
Fig. 3 – PRIOR ART

APPARATUS FOR CARRYING OUT AN OPERATION ON SLAUGHTERED POULTRY OR ON A PART OF SLAUGHTERED POULTRY

PRIORITY STATEMENT

The present application claims priority under 35 U.S.C. § 119 to Dutch patent application No. 2023211, filed May 27, 2019.

FIELD OF THE INVENTION

The subject matter of the present disclosure relates generally to an apparatus for carrying out an operation on slaughtered poultry or on a part of slaughtered poultry.

BACKGROUND OF THE INVENTION

An apparatus for carrying out an operation on slaughtered poultry is well known in the art of poultry processing, as seen for instance in EP-A-0 432 317, U.S. Pat. No. 4,730,365 and EP-A-2 965 632.

EP-A-0 432 317 and U.S. Pat. No. 4,730,365 further discloses that the movable mounting block is up-and-down movable within the at least one carrier device. U.S. Pat. No. 4,730,365 also shows that the carrier device includes a frame that is movable up-and-down slides that are provided on the periphery of the drum, and that the movable mounting block is connected with and movable with respect to the frame of the at least one carrier device. The frame and the mounting block of U.S. Pat. No. 4,730,365 have separate drives for individually moving the frame and the mounting block up-and-down, so as to perform a neck breaking action on suspended poultry.

To adjust to the size of the poultry or poultry part being processed, it is known that the drum can be raised or lowered. The example of EP-A-2 965 632 relates to the application of two cooperating drums that are rotationally adjustable and that have an adjustable distance with respect to each other.

The known solutions for adjusting to the size of the poultry or poultry parts to be processed are of the type one-size-fits-all. But like people, poultry and poultry parts do not have the same dimensions, which means that the one-size-fits-all solution means in practice that the fit of the machine to the poultry or poultry part is hardly ever optimal, which may lead to inaccuracies in the processing of the poultry and lower than possible yield when the apparatus is applied for meat harvesting.

BRIEF DESCRIPTION OF THE INVENTION

An exemplary object of the invention to provide a better solution to replace the prior art one-size-fits-all approach.

In one exemplary aspect, the invention relates to an apparatus for carrying out an operation on slaughtered poultry or on a part of slaughtered poultry, including at least one carrier device for carrying the poultry or the part of the poultry, a drum which at its periphery is provided with at least one groove, which at least one groove is traced by a roller that is mounted on the at least one carrier device so as to arrange that movement of the at least one carrier device along the periphery of the drum causes the at least one carrier device to execute an operation with reference to the poultry or poultry part, wherein the at least one carrier device includes a movable mounting block that supports the roller.

In another exemplary aspect, the movable mounting block is up-and-down movable within the at least one carrier device, wherein the carrier device includes a frame that is movable up-and-down slides that are provided on the periphery of the drum, and the movable mounting block is connected with and movable with respect to the frame of the at least one carrier device, wherein the up-and-down motion of the frame along the slides is determined by the mounting block. The relative position of the carrier device with reference to the drum and the mounting block can then be adjusted, and a precise fit of the height of the carrier device in relation to the drum is then possible taking account of the size of the individual poultry or poultry part that is to be processed.

In an exemplary embodiment, the mounting block and the frame include a bolt and nut with cooperating first and second screw threads that are arranged to cause that upon a turning motion of one of the bolt and nut with respect to each other, the mounting block and the frame carry out a displacement with reference to each other in a direction perpendicular to the turning motion.

The bolt may be mounted on the frame and is provided with screw thread at its outer circumference and with a central through hole, wherein one of the slides passes through the central through hole of the bolt, and wherein the one of the slides and the bolt are rotationally fixed with reference to each other. Rotation of the slide then causes that also the bolt through which the slide passes will be rotated.

Different arrangements are possible to link the rotation of the slide to the rotation of the bolt. In one suitable embodiment, the one of the slides that passes through the central through hole of the bolt, and the bolt are provided with a cooperating spline and pin reaching into the spline.

In another exemplary embodiment, the one of the slides that passes through the central through hole of the bolt and the central through hole of the bolt are pre-shaped to prevent their rotation with respect to each other. Thus, when the slide rotates also the bolt rotates, since they are rotationally fixed with respect to each other.

In most cases, the at least one carrier device includes more than one mounting block, wherein it is preferred that each mounting block supports a roller that traces a groove of the drum, and that each mounting block is arranged to keep its distance with reference to each other mounting block of the at least one carrier device while being up-and-down movable with reference to the remainder of the at least one carrier device. It is important that the respective mounting blocks keep their mutual distance in order to secure the cooperation of the rollers with the grooves in the drum around which the carrier device moves during operation.

In an embodiment wherein the carrier device includes multiple frames with a fixed mutual distance, wherein the frames are movable up-and-down slides that are provided on the periphery of the drum, it is desirable that each mounting block is connected with and movable with respect to one of the multiple frames of the at least one carrier device.

In another exemplary aspect, each mounting block and each frame cooperating with such mounting block include a bolt and nut with cooperating first and second screw threads that are arranged to cause that upon a turning motion of one of the bolt and nut of each mounting block and frame with respect to each other, the concerning mounting block and frame cooperating with such mounting block carry out a synchronous displacement with reference to each other in a direction perpendicular to the turning motion.

Suitably the bolts that are mounted on the frames of the same carrier device and that are each provided with screw thread at their outer circumference and with central through holes, may be arranged on the carrier device such that only one of the slides passes through the central through holes of all such bolts, wherein the slide which passes through the central through holes and the bolts are rotationally fixed with reference to each other. This secures in an easy way the synchronous up-and-down movement of the mounting blocks provided on the same carrier device.

Preferably the screw threads are trapezoid. This is beneficial to promote sturdiness of the screw threads and accuracy of the height positioning.

In another exemplary aspect of the invention, the one of the slides that passes through the central through hole or central through holes is provided with or connects to a drivetrain for rotating the one of the slides. This enables motorized adjustment of the apparatus to the size of the poultry or poultry part that will be processed. Furthermore, it opens the way to automation of this adjustment. For that purpose it is further preferable that the apparatus includes a monitoring system for monitoring the size of the poultry or poultry parts to be processed, which monitoring system drivingly connects to the drivetrain for rotating the one of the slides depending on the size of the measure poultry or poultry parts.

The apparatus of the invention therefore has the features of one or more of the appended claims.

BRIEF DESCRIPTION OF THE DRAWINGS

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents Exemplary aspects of the invention will hereinafter be further elucidated with reference to a drawing of a non-limiting exemplary embodiment of the apparatus and a method of its use in accordance with the invention.

In the drawings, FIGS. 1 through 7, the subsequent steps of an exemplary method of the invention are depicted as executed with an exemplary embodiment of the apparatus of the invention, wherein:

FIG. 1 shows a separate drum as used in the prior art carousel machine shown in FIG. 2, and in an exemplary apparatus of the invention;

FIG. 2 shows a carousel machine according to prior art with central height adjustment;

FIG. 3 shows a carrier device according to prior art;

Whenever in the FIGS. the same reference numerals are applied, these numerals refer to the same parts.

DETAILED DESCRIPTION OF THE INVENTION

Figure 4:
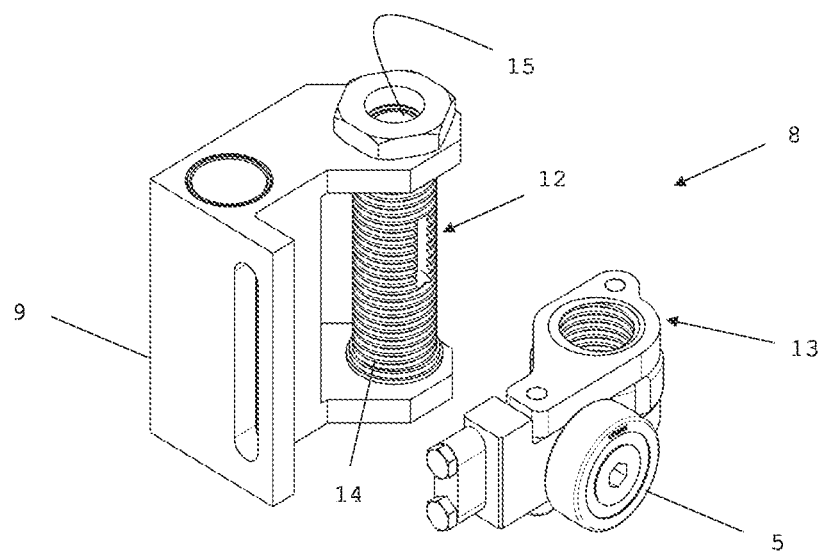
FIG. 4 shows an exploded view of a mounting block supporting a roller together with a frame that is fixed to an exemplary carrier device of the invention.

Turning now first to FIG. 2, an apparatus 1 is shown, in particular a prior art carousel machine, which is used when carrying out an operation on slaughtered poultry or on a part of slaughtered poultry. Such a carousel machine of the prior art has a central adjustment shaft 2 for adjusting the height of the drum 3. The drum 3 is separately shown in FIG. 1, which shows that the drum 3 has at its periphery one or more grooves 4. These grooves 4 cooperate with rollers 5 that are mounted on mounting blocks 6 of the prior art carrier device 7 shown in FIG. 3. A plurality of such carrier devices 7 are provided at the periphery of the drum 3 shown in FIG. 2.

As mentioned the rollers 5 cooperate with the grooves 4 in the drum 3, in the sense that these grooves 4 are traced by the rollers 5 that are mounted on the carrier device 7 so as to arrange that movement of the carrier device 7 along the periphery of the drum 3 causes the carrier device 7 to assume a position enabling an operation with reference to the poultry or poultry part. This is all known subject matter for the skilled person and requires in fact no elucidation. It is what the prior art and the invention have in common.

The exemplary features that define the embodiments of invention will be discussed hereinafter.

Figure 5:
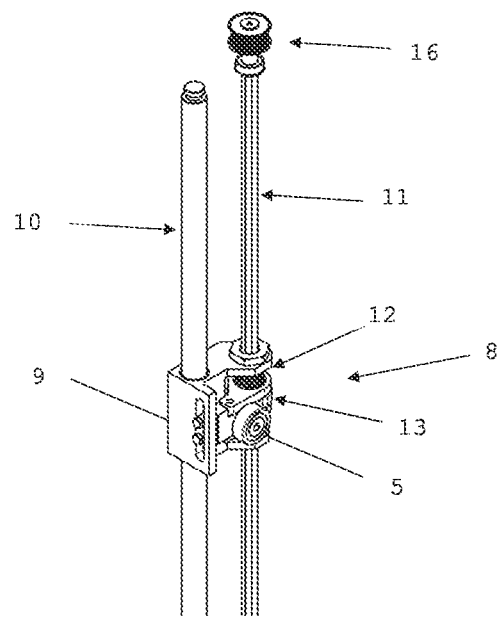
FIG. 5 shows the mounting block or FIG. 4 together with slides that are provided at the outer circumference of the drum of a carousel machine.

The (at least one) carrier device 7 that moves during operation around the drum 3, includes a movable mounting block 8 that supports the roller 5 as is shown in FIG. 4 and FIG. 5. The movable mounting block 8 is up-and-down movable with reference to the remainder of the (at least one) carrier device 7, or in other words: the movable mounting block 8 is up-and-down movable within the at least one carrier device. This is embodied by arranging that the mounting block 8 is movable with reference to a frame 9 that is stationary with reference to the substance of the carrier device 7. In fact this movable mounting block 8 together with the stationary frame 9 as shown in FIGS. 4 and 5, replaces the mounting block 6 of the prior art as shown in FIG. 3, which is fixed and stationary with reference to the remainder of the carrier device 7, albeit that also the known mounting block 6 is of course up-and-down movable according to the track of the grooves 4 in the drum 3.

To realize the movability of the mounting block 8 with reference to the remainder of the carrier device 7, the frame 9 of the carrier device 7 is movable up-and-down slides 10, 11 that are provided on the periphery of the drum 3, wherein the mounting block 8 is connected with and movable with respect to the frame 9 of the at least one carrier device 7. This is shown in FIG. 5. It follows therefrom that the up-and-down motion of the frame 9 along the slides 10, 11 is determined by the mounting block 8.

FIG. 4 clearly shows that the mounting block 8 and the frame 9 include a bolt 12 and nut 13 with cooperating first and second screw threads that are arranged to cause that upon a turning motion of one of the bolt 12 and nut 13 with respect to each other, the mounting block 8 and the frame 9 carry out a displacement with reference to each other in a direction perpendicular to the turning motion. FIG. 4 shows that the bolt 12 is mounted on the frame 9 and is provided with screw thread 14 at its outer circumference and with a central through hole 15.

FIG. 5 depicts that one of the slides, notably slide 11, passes through the central through hole 15 of the bolt 12. The slide 11 and the bolt 12 are rotationally fixed with reference to each other. This can be realized in several ways. One preferred way of rotationally fixing the slide 11 and the bolt 12 is by providing the slide 11 and bolt 12 with a co-operating keyway and key reaching into the keyway, which prevents rotation of the bolt 12 but does not prevent its sliding along the slide 11. The manner in which this can be carried out is clear to the skilled person and requires no further elucidation. As an alternative it is also possible that the slide 11 that passes through the central through hole 15 of the bolt 12 and the central through hole 15 of the bolt 12 are pre-shaped to prevent their rotation with respect to each other. This is also clear to the skilled person and requires no further elucidation.

Usually the (at least one) carrier device 7 includes more than one mounting block 6, as is shown in the prior art embodiment of FIG. 3. This also applies to the mounting block 8 of this exemplary embodiment of the invention, wherein each mounting block 8 supports a roller 5 that traces a groove 4 of the drum 3. It is preferred that each of the plural mounting blocks 8 is arranged to keep its distance with reference to each other mounting block 8 of the concerning carrier device 7, while being up-and-down movable with reference to the remainder of the concerning carrier device 7. In an embodiment wherein the carrier device 7 includes multiple frames 9 with a fixed mutual distance, which frames 9 are movable up-and-down slides 10, 11 that are provided on the periphery of the drum 3, it is preferred that each mounting block 8 is connected with and movable with respect to one of the multiple frames 9 of the carrier device.

When applying multiple mounting blocks 8 and frames 9 on a single carrier device 7, it is desirable that each mounting block 8 and each frame 9 cooperating with such mounting block 8 include a bolt 12 and nut 13 with cooperating first and second screw threads that are arranged to cause that upon a turning motion of one of the bolt 12 and nut 13 of each mounting block 8 and frame 9 with respect to each other, the concerning mounting blocks 8 and frames 9 cooperating with such mounting blocks 8 carry out a synchronous displacement with reference to each other in a direction perpendicular to the turning motion.

Likewise it is desirable that the bolts 12 that are mounted on the frames 9 of the same carrier device 7 and that are each provided with screw thread at their outer circumference and with central through holes 15, are arranged on the carrier device 7 such that only one of the slides 11 passes through the central through holes 15 of all such bolts 12, wherein the slide 11 which passes through the central through holes 15 and the bolts 12 are rotationally fixed with reference to each other.

In one exemplary aspect, preferable the screw threads are trapezoid.

Figure 6:
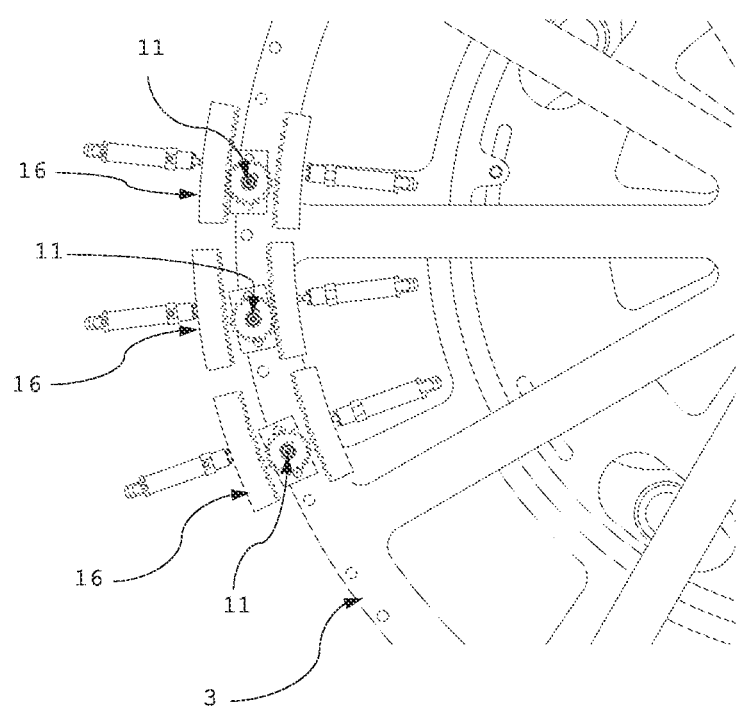
FIG. 6 shows a top view at a part of the drum with the circumferentially provided slides for the mounting blocks.

FIG. 6 depicts another exemplary aspect of the invention, notably that the slide 11 that passes through the central through hole or central through holes is provided with or connects to a drivetrain 16 for rotating the one of the slides. Looking at the FIG. from right to left it respectively shows no rotation or adjustment of the slide 11, a counter-clockwise rotation of the slide 11 in the middle, and a clockwise rotation of the slide 11 on the left.

Figure 7:
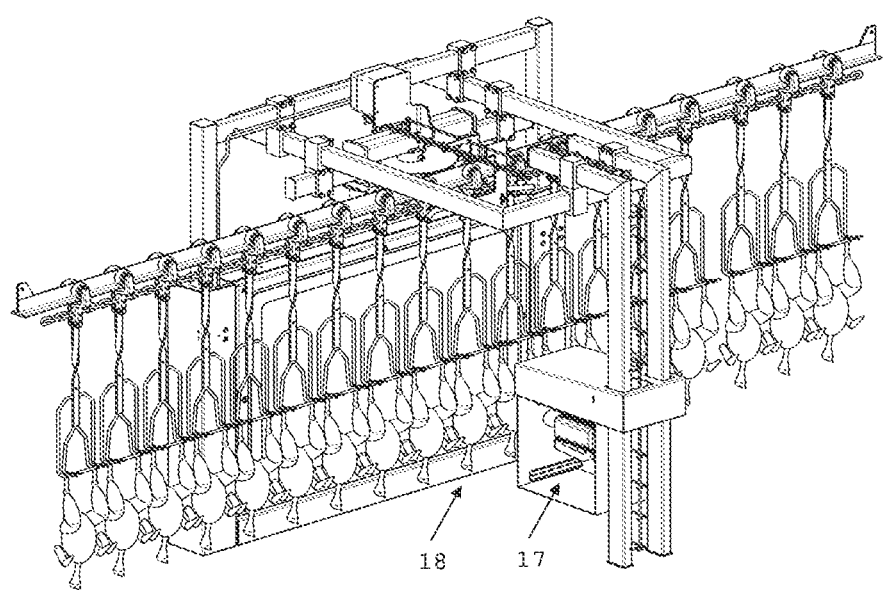
FIG. 7 shows an exemplary monitoring system.

FIG. 7 finally shows that this exemplary apparatus of the invention includes a monitoring system 17 for monitoring the size of the poultry 18 or poultry parts to be processed, which monitoring system 17 drivingly connects to the drivetrain 16 for rotating the slide 11 depending on the size of the measured poultry 18 or poultry parts.

Although the invention has been discussed in the foregoing with reference to an exemplary embodiment of the apparatus of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. An apparatus for carrying out an operation on slaughtered poultry or on a part of slaughtered poultry, comprising:
    at least one carrier device for carrying the poultry or the part of the poultry;
    a drum having a periphery that includes at least one groove, which at least one groove is traced by a roller that is mounted on the at least one carrier device so as to arrange that movement of the at least one carrier device along the periphery of the drum causes the at least one carrier device to assume a position enabling the operation on the slaughtered poultry or poultry part;
    slides positioned on the periphery of the drum;
    wherein the at least one carrier device comprises
        a movable mounting block that supports the roller, wherein the movable mounting block is up-and-down movable within the at least one carrier device;
        a frame that is movable up-and-down the slides,
        wherein the movable mounting block is connected with, and movable with respect to, the frame of the at least one carrier device,
        wherein the up-and-down motion of the frame along the slides is determined by the mounting block.

2. The apparatus according to claim 1, wherein the mounting block and the frame comprise a bolt and nut with cooperating first and second screw threads that are arranged to cause that upon a turning motion of one of the bolt and nut with respect to each other, the mounting block and the frame carry out a displacement with reference to each other in a direction perpendicular to the turning motion.

3. The apparatus according to claim 2, wherein the bolt is mounted on the frame and is provided with screw thread at its outer circumference and with a central through hole, wherein one of the slides passes through the central through hole of the bolt, and wherein the one of the slides and the bolt are rotationally fixed with reference to each other.

4. The apparatus according to claim 3, wherein the one of the slides that passes through the central through hole of the bolt and the bolt are provided with a cooperating spline and pin reaching into the spline.

5. The apparatus according to claim 4, wherein one of the slides that passes through the central through hole of the bolt and the central through hole of the bolt are pre-shaped to prevent their rotation with respect to each other.

6. The apparatus according claim 1, wherein the at least one carrier device comprises more than one mounting block, each mounting block supporting a roller that traces a groove of the drum, and each mounting block being arranged to keep its distance with reference to each other mounting block of the at least one carrier device while being up-and-down movable with reference to the remainder of the at least one carrier device.

7. The apparatus according to claim 6, wherein the carrier device comprises multiple frames with a fixed mutual distance and which are movable up-and-down slides that are provided on the periphery of the drum, characterized in that each mounting block is connected with and movable with respect to one of the multiple frames of the at least one carrier device.

8. The apparatus according to claim 6, wherein each mounting block and each frame cooperating with such mounting block comprise a bolt and nut with cooperating first and second screw threads that are arranged to cause that upon a turning motion of one of the bolt and nut of each mounting block and frame with respect to each other, the concerning mounting blocks and frames cooperating with such mounting blocks carry out a synchronous displacement with reference to each other which is directed perpendicular to the turning motion.

9. The apparatus according to claim 8, wherein the bolts that are mounted on the frames of the same carrier device and are each provided with screw thread at their outer circumference and with central through holes and are arranged on the carrier device such that only one of the slides passes through the central through holes of all such bolts, wherein the one slide which passes through the central through holes and the bolts are rotationally fixed with reference to each other.

10. The apparatus according to any one of claim 1, wherein the screw threads are trapezoid in shape.

11. The apparatus according to claim 10, wherein the one of the slides that passes through the central through hole or central through holes is provided with or connects to a drivetrain for rotating the one of the slides.

12. The apparatus according to claim 11, further comprising a monitoring system for monitoring the size of the poultry or poultry parts to be processed, which monitoring system drivingly connects to the drivetrain for rotating the one of the slides depending on the size of the measured poultry or poultry parts.

* * * * *